United States Patent
Hanatani et al.

(10) Patent No.: US 9,515,827 B2
(45) Date of Patent: Dec. 6, 2016

(54) KEY MANAGEMENT DEVICE, COMMUNICATION DEVICE, COMMUNICATION SYSTEM, AND COMPUTER PROGRAM PRODUCT

(71) Applicant: Kabushiki Kaisha Toshiba, Minato-ku (JP)

(72) Inventors: Yoshikazu Hanatani, Kawasaki (JP); Toru Kambayashi, Chigasaki (JP); Tatsuyuki Matsushita, Koto-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 23 days.

(21) Appl. No.: 14/132,148

(22) Filed: Dec. 18, 2013

(65) Prior Publication Data

US 2014/0173283 A1 Jun. 19, 2014

(30) Foreign Application Priority Data

Dec. 19, 2012 (JP) .................................. 2012-277316

(51) Int. Cl.
*H04L 9/32* (2006.01)
*H04L 9/08* (2006.01)

(52) U.S. Cl.
CPC .................................. *H04L 9/0891* (2013.01)

(58) Field of Classification Search
CPC .................................................... H04L 9/0819
USPC ........................................................ 713/171
See application file for complete search history.

(56) References Cited

U.S. PATENT DOCUMENTS

| 6,049,878 | A * | 4/2000 | Caronni et al. .................... 726/3 |
| 7,961,887 | B2 | 6/2011 | Matsushita |
| 2002/0104019 | A1 * | 8/2002 | Chatani et al. ............... 713/201 |
| 2008/0165958 | A1 * | 7/2008 | Matsushita ............. G06F 21/10 380/44 |
| 2012/0011360 | A1 * | 1/2012 | Engels .................... H04L 9/006 713/166 |

OTHER PUBLICATIONS

U.S. Appl. No. 14/468,764, filed Aug. 26, 2014, Zhao, et al.
Benny Chor et al. "Tracing Traitors", IEEE Transactions on Information Theory, vol. 46, No. 3, May 2000, 18 pages.

(Continued)

*Primary Examiner* — Peter Shaw
(74) *Attorney, Agent, or Firm* — Oblon, McClelland, Maier & Neustadt, L.L.P.

(57) ABSTRACT

According to an embodiment, a key management device includes a key exchange processing unit, a transmission unit, and an update unit. The key exchange processing unit is configured to perform a key exchange process for executing an exchange of a shared key together with authentication between the key management device and a communication device. The transmission unit is configured to transmit update information for updating a device key of the communication device authenticated to the communication device, when the communication device has not been authenticated before performing the key exchange process, and not to transmit the update information, otherwise. The update unit is configured to update the device key using the update information, when the communication device has not been authenticated before performing the key exchange process, and not to update the device key, otherwise.

19 Claims, 8 Drawing Sheets

(56) References Cited

OTHER PUBLICATIONS

Amos Fiat et al. "Dynamic Traitor Tracing", Journal of Cryptology, vol. 14, No. 3, 2001, 13 pages.
Japanese Office Action issued Aug. 30, 2016 in corresponding Japanese Application No. 2012-277316 (with English translation).

* cited by examiner

KEY MANAGEMENT DEVICE, COMMUNICATION DEVICE, COMMUNICATION SYSTEM, AND COMPUTER PROGRAM PRODUCT

CROSS-REFERENCE TO RELATED APPLICATION

This application is based upon and claims the benefit of priority from Japanese Patent Application No. 2012-277316, filed on Dec. 19, 2012; the entire contents of which are incorporated herein by reference.

FIELD

Embodiments described herein relate generally to a key management device, a communication device, a communication system, and a computer program product.

BACKGROUND

There is a technique for protecting content by giving a key for reproducing the content only to an authorized reproduction device. However, when the key for reproducing the content is leaked, even an unauthorized device can reproduce the content. In order to prevent damages caused by the leaked key, it is necessary to invalidate the leaked key.

As a technique for invalidating a leaked key, there is a copyright protection technology by media key block (MKB). By using this technology, when there is a content reproduction device that has been duplicated in an unauthorized manner using a leaked key, it is possible to invalidate the leaked key by identifying a device key used in the duplicated device and then appropriately updating MKB. In a typical method for identifying a leaked device key, a duplicated reproduction device is obtained, and analysis is performed off-line to identify a device key used in the duplicated reproduction device.

However, in the conventional technique, when a duplicated device is difficult to be obtained such as a case where a duplicated device is not commercially available, it has been difficult to identify a leaked device key.

DETAILED DESCRIPTION

Figure 1:
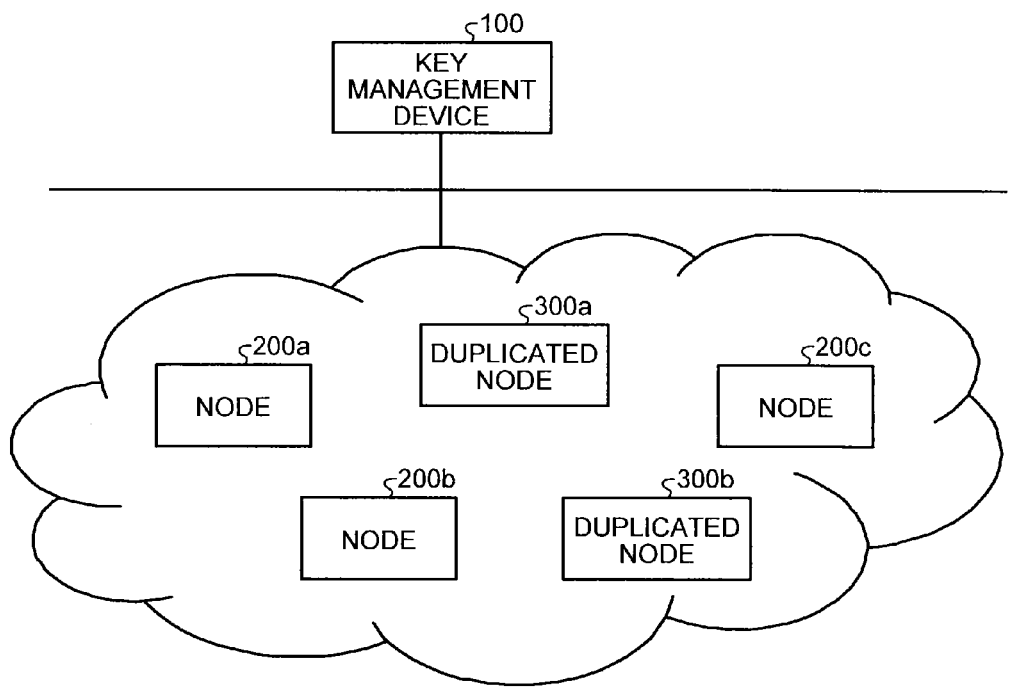
FIG. 1 is a block diagram of a communication system according to a first embodiment.

According to an embodiment, a key management device includes an authentication state storage unit, a key exchange processing unit, a determination unit, a transmission unit, and an update unit. The authentication state storage unit is configured to store therein an authentication state including identification information of a communication device. The communication device has already been authenticated. The key exchange processing unit is configured to perform a key exchange process for executing an exchange of a shared key together with authentication between the key management device and a communication device. The determination unit is configured to determine whether a communication device authenticated by the key exchange process has already been authenticated before performing the key exchange process on the basis of the authentication state. The transmission unit is configured to transmit update information for updating a device key of the communication device authenticated by the key exchange process to the communication device authenticated by the key exchange process when the communication device has not been authenticated before performing the key exchange process, and not to transmit the update information when the communication device has already been authenticated before performing the key exchange process. The update unit is configured to update the device key using the update information when the communication device has not been authenticated before performing the key exchange process, and not to update the device key when the communication device has already been authenticated before performing the key exchange process.

Hereinbelow, preferred embodiments of a key management device according to the present invention will be described in detail with reference to the accompanying drawings.

First Embodiment

There is known a method for identifying a device key that is used in a duplicated device in such a manner that a duplicated device is obtained, a cryptogram generated with each device key is input to the duplicated device, and whether or not the cryptogram is correctly decoded is checked. However, disadvantageously, when the duplicated device is difficult to be obtained, such an identification method cannot be employed.

Therefore, a communication system according to the first embodiment performs authentication on a communication device (hereinbelow, referred to as a node) by a key management device, the authentication indicating that the node holds a device key, and sends information (update information) for updating the device key to the node that has passed the authentication. The authentication is performed at timing such as every time a time period T elapses and when a signal is input from an external device. Further, the time period T is not necessarily always constant. When authentication is performed after a time period T1 elapses, next authentication may be performed after a time period T2 that is different from the time period T1 elapses. Further, different time periods can be set according to belonging groups in such a manner that authentication is performed on a device that belongs to a group 1 every time the time period T1 elapses, and authentication is performed on a device that belongs to a group 2 every time the time period T2 elapses. As such groups, previously determined groups such as groups according to manufacturers of devices and groups according to regions in which devices are installed, or groups that are dynamically allocated by a system administrator according to the state of the system can be employed. When authentication based on a same device key is performed a plurality of times and successful, the device key can be identified to have been leaked. Further, a node that does not correctly respond to authentication in order to avoid being identified cannot pass the authentication. Therefore, the node cannot obtain update information for updating a device key, and therefore cannot correctly perform communication thereafter.

In the communication system that includes nodes according to the present embodiment, the respective nodes previously record thereon device key sets assigned thereto. Each of the device key sets includes at least one key that is specific to the corresponding node. When a node receives a request for authentication from the key management device, the node performs authentication which indicates that the node holds a correct device key using the device key specific to the node. Further, when the node receives update information for updating the device key from the key management device, the node updates the device key with the key management device by a previously determined method.

As described above, in the present embodiment, in order to identify and eliminate a leaked key, it is not necessary to obtain a duplicated device as in a conventional method as long as an authorized device and the key management device are connected to each other via a network.

FIG. 1 is a block diagram illustrating an example of the configuration of the communication system according to the first embodiment. As shown in FIG. 1, in the communication system of the present embodiment, a plurality of nodes 200a to 200c and a key management device 100 are connected to each other via a network. Further, duplicated nodes 300a and 300b each of which is a duplicated device configured using a leaked device key are mixed in the network that is managed by the key management device 100.

Since the nodes 200a to 200c have the same configuration, the nodes 200a to 200c are merely referred to as nodes 200 when the nodes 200 are not required to be distinguished from each other. Similarly, the duplicated nodes 300a and 300b are merely referred to as nodes 300 when the nodes 300 are not required to be distinguished from each other. The number of the nodes 200 is not limited to three. Further, the number of the duplicated nodes 300 is not limited to two. All possible network forms such as the Internet can be applied as the network. The respective nodes are not necessary to be directly connected to the key management device 100.

In the present embodiment, when the key management device 100 transmits an authentication request to the respective nodes 200, the authentication is started.

Figure 2:
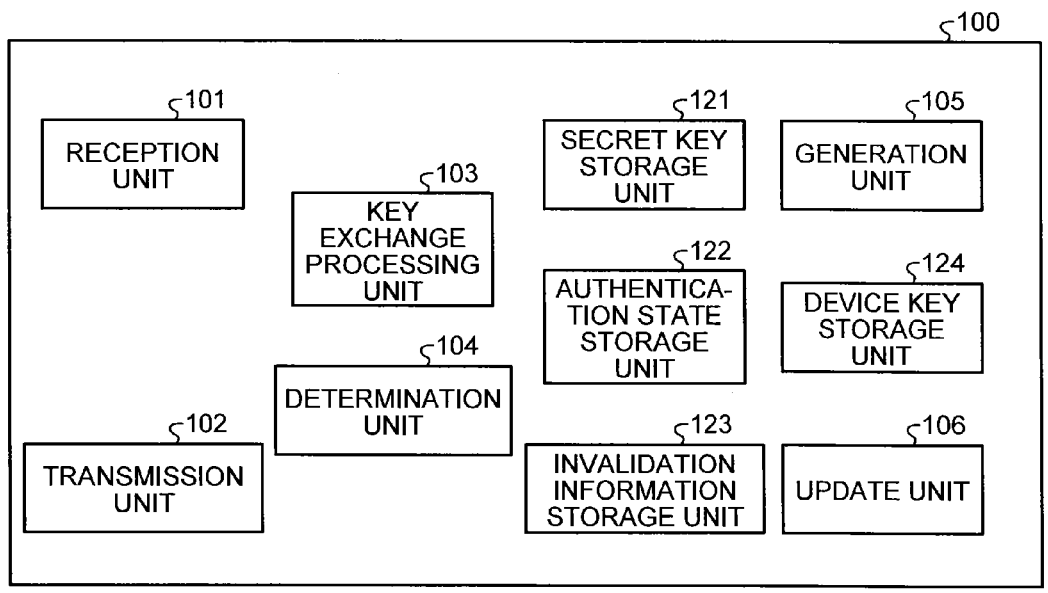
FIG. 2 is a block diagram of a key management device of the first embodiment.

FIG. 2 is a block diagram illustrating an example of the configuration of the key management device 100. As shown in FIG. 2, the key management device 100 is provided with a secret key storage unit 121, an authentication state storage unit 122, an invalidation information storage unit 123, a device key storage unit 124, a reception unit 101, a transmission unit 102, a key exchange processing unit 103, a determination unit 104, a generation unit 105, and an update unit 106.

The secret key storage unit 121 stores therein a secret key that is required for performing authentication as being the key management device 100 with the nodes 200 by a public key cryptosystem. The authentication state storage unit 122 stores therein an authentication state including identification information (node ID) of a node 200 that has passed the authentication (a node 200 that has already been authenticated). The authentication state may include a device key of the node 200.

The invalidation information storage unit 123 stores therein invalidation information including a node ID of a node 200 that has been determined to be invalidated by the key management device 100, and a device key of the node 200.

The device key storage unit 124 stores therein information including a node ID of a node 200 that belongs to a group to be managed by the key management device 100 and a device key set assigned to the node 200. More specifically, the device key storage unit 124 stores therein the node ID and the device key set of the node 200 identified by the node ID in association with each other.

A device key is assigned, for example, in accordance with a complete subtree (CS) method. In this case, authentication using a leaf key is performed on the node 200. The leaf key is an example of a device key component specific to each device. A device key configuration method is not limited to the CS method. All possible configuration methods having a device key component specific to a node 200 such as a subset difference (SD) method and a logical key hierarchy (LKH) method can be applied.

The reception unit 101 receives various pieces of information from an external device such as the node 200. The reception unit 101 receives, for example, a request for the start of authentication and data during executing an authenticated key exchange protocol. The authenticated key exchange protocol indicates key exchange processing that performs an exchange of a shared key together with authentication. The request for the start of authentication is a request for starting authentication to eliminate the duplicated nodes 300. The authentication may be performed not only when receiving a request for group control from an external device, but also when the necessity of elimination of the duplicated nodes 300 is determined in the key management device 100 and the elimination is thereby determined to be necessary. The reception unit 101 transmits the request for the start of authentication and the data of the authenticated key exchange protocol to the key exchange processing unit 103.

The transmission unit 102 transmits various pieces of information to an external device such as the node 200. The transmission unit 102 transmits, for example, data during executing an authenticated key exchange protocol. Further, the transmission unit 102 transmits update information for updating a device key of a node 200 to the node 200.

The key exchange processing unit 103 executes an authenticated key exchange protocol with a node 200 when receiving the request for the start of authentication. The key exchange processing unit 103 confirms whether a node ID of the node 200 with which the authentication key exchange protocol is executed is not stored in the invalidation information storage unit 123, that is, whether the node ID has not been invalidated. When the node ID has been invalidated, the key exchange processing unit 103 returns an error, and interrupts processing thereafter. Then, the key exchange processing unit 103 sends the node ID to the device key storage unit 124, and requests a device key that corresponds to the node ID.

The device key storage unit 124 returns the device key corresponding to the node ID to the key exchange processing unit 103 in response to the request. If a device key that corresponds to the node ID is not stored, the device key storage unit 124 returns an error. Further, the key exchange processing unit 103 reads out a secret key of the key management device 100 from the secret key storage unit 121. The node ID is included, for example, in data during executing the authenticated key exchange protocol. In this case, the node ID can be obtained from, for example, the reception unit 101. Then, the key exchange processing unit 103 transmits the derived data to the transmission unit 102, and receives the data from the reception unit 101 to execute the authenticated key exchange protocol. When the authenticated key exchange is finally successful, the derived shared key, the authentication target node ID, and the device key used in the authentication are transmitted to the determination unit 104.

In this manner, the key exchange processing unit 103 executes a hybrid key exchange protocol including the authenticated key exchange using a public key cryptosystem (authentication of the key management device 100) and the authenticated key exchange using a previously shared key (authentication of the node 200).

The key exchange processing unit 103 may execute a key exchange protocol other than the hybrid key exchange protocol. For example, instead of the key exchange using a previously shared key, the key management device 100 may authenticate the node 200 by a public key cryptosystem using a public key of the node 200. In this case, for example, the key management device 100 may be provided with a public key storage unit (not shown) which stores therein the public key of the node 200, and the key exchange processing unit 103 may authenticate the node 200 using the stored public key. In this case, the key exchange protocol is not a hybrid key exchange protocol. When executing the hybrid type key exchange protocol, since a previously shared key which already exists can be used, it is possible to more efficiently execute the processing.

The authentication using a device key may be repeatedly performed a plurality of times with respect to a single node 200 to improve the accuracy of the authentication. For example, when a duplicated node 300 has a plurality of device keys, the key exchange processing unit 103 may execute the authenticated key exchange protocol with respect to each of the device keys of the duplicated node 300. This makes it possible to check device keys that have been acquired in an unauthorized manner at once.

The determination unit 104 determines whether a node 200 authenticated by the authenticated key exchange protocol has already been authenticated before executing the authenticated key exchange protocol with reference to the authentication state stored in the authentication state storage unit 122. For example, when the determination unit 104 receives a shared key, a node ID, and a device key from the key exchange processing unit 103, the determination unit 104 examines whether the node ID and the device key have already been recorded on the authentication state storage unit 122. When the node ID and the device key have been already recorded, the determination unit 104 determines that a device that uses the node ID and the device key is duplicated. Then, the determination unit 104 stores invalidation information including the node ID and the device key in the invalidation information storage unit 123. As this point, a region for recording the number of authentication successes may be provided in the authentication state storage unit 122 to increase the number of times corresponding to node ID of the authenticated node 200.

When the node ID and the device key have not been recorded, the determination unit 104 records the received node ID and device key on the authentication state storage unit 122. Then, the determination unit 104 requests update information for updating the device key to the generation unit 105.

The generation unit 105 generates update information in response to the request. The update information may be any information as long as the information can derive an updated device key from the device key before being updated and the update information.

The determination unit 104 receives the update information from the generation unit 105. The determination unit 104 encrypts the update information using the shared key, and sends the thus obtained cryptogram to the transmission unit 102. The transmission unit 102 transmits the encrypted update information to the node 200. The determination unit 104 sends the update information and the node ID to the update unit 106.

When the update unit 106 receives the update information and the node ID, the update unit 106 sends the node ID to the device key storage unit 124 to read out a device key that corresponds to the node ID. Then, the update unit 106 derives an updated device key using the read-out device key and the update information. The update unit 106 records a set of the node ID and the updated device key on the device key storage unit 124.

An example of a method for updating a device key will be described below. In the following description, H denotes a hash function that is shared in the system, (K1, K2, K3) denotes device keys to be updated, and seed denotes update information.

In this case, updated device keys (K1', K2', K3')=(H (seed, K1), H (seed, K2), H (seed, K3)) is satisfied. For example, when H is a pseudo random function, it is a kind of one-way function, even if H and (K1, K2, K3) are retained, it is not possible to estimate (K1', K2', K3') without seed.

In the present embodiment, device keys are updated using the same seed. However, different seeds may be used for respective device keys. For example, in the case of the above example, the update information includes seed 1, seed 2, and seed 3, and the device keys may be updated in a manner such as (K1', K2', K3')=(H (seed 1, K1), H (seed 2, K2), H (seed 3, K3)). By performing the update in this manner, update information can be made different in respective nodes. Therefore, resistance to update information leakage is increased.

Further, the updated device keys themselves may be directly sent without sending the seed for update. More specifically, (K1', K2', K3') are sent as update information, and the node 200 assigns the received information to the updated device keys.

A method for invalidating a node 200 that has been determined to be invalidated may be any method. For example, the node 200 (a device key of the node 200) can be invalidated using the above-described MKB technology.

Figure 3:
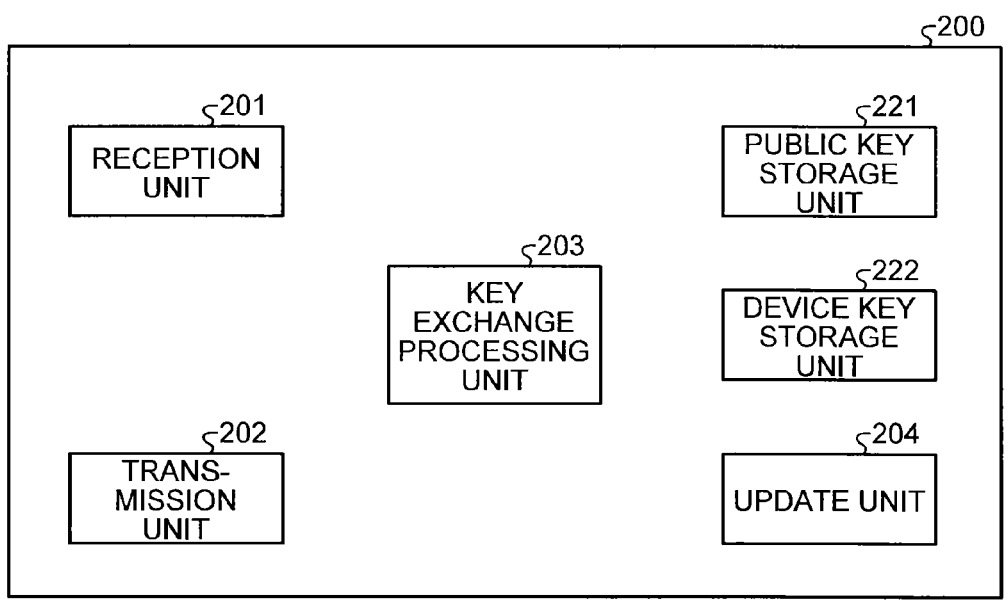
FIG. 3 is a block diagram of nodes of the first embodiment.

FIG. 3 is a block diagram illustrating an example of the configuration of the node 200. As shown in FIG. 3, the node 200 is provided with a public key storage unit 221, a device key storage unit 222, a reception unit 201, a transmission unit 202, a key exchange processing unit 203, and an update unit 204.

The public key storage unit 221 stores therein the public key of the key management device 100. The device key storage unit 222 stores therein a node ID and a device key assigned to the node 200 itself.

The reception unit 201 receives various pieces of information from an external device such as the key management device 100. The reception unit 201 receives, for example, a request for the start of authentication, data during executing an authenticated key exchange protocol, and a cryptogram of key update information from the key management device 100.

The transmission unit 202 transmits various pieces of information to an external device such as the key management device 100. The transmission unit 202 transmits, for example, data during executing an authenticated key exchange protocol.

The key exchange processing unit 203 executes the authenticated key exchange protocol using the node ID and the device key stored in the device key storage unit 222 and the public key stored in the public key storage unit 221. When the authenticated key exchange is successful, the key exchange processing unit 203 sends a shared key obtained as a result of the authenticated key exchange to the update unit 204. When the authenticated key exchange is not successful, the node 200 finishes the processing.

The update unit 204 receives the shared key from the key exchange processing unit 203, and receives a cryptogram from the transmission unit 202. Then, the update unit 204 decodes the cryptogram using the shared key to obtain update information for updating the device key. Then, the update unit 204 reads out the device key from the device key storage unit 222, and derives an updated device key from the read-out device key and the update information. The update unit 204 stores the updated device key in the device key storage unit 222.

The respective storage units described above can include all possible generally-used storage mediums such as a hard disk drive (HDD), an optical disk, a memory card, and a random access memory (RAM).

The respective units (the reception unit 101, the transmission unit 102, the key exchange processing unit 103, the determination unit 104, the generation unit 105, and the update unit 106) of the key management device 100 and the respective units (the reception unit 201, the transmission unit 202, the key exchange processing unit 203, and the update unit 204) of the node 200 may be realized by causing a processing unit such as a central processing unit (CPU) to execute a program, that is, by software, may be realized by hardware such as an integrated circuit (IC), or may be realized by a combination of software and hardware.

Next, elimination processing performed by the communication system according to the first embodiment configured in the above manner will be described. In the elimination processing, an unauthorized device (a duplicated node 300) is detected by executing an authenticated key exchange protocol, and the detected duplicated node 300 is made to be unable to access the communication system. Hereinbelow, the elimination processing will be described by dividing the elimination processing into processing performed by the key management device 100 (FIG. 4) and processing performed by the node 200 (FIG. 5).

Figure 4:
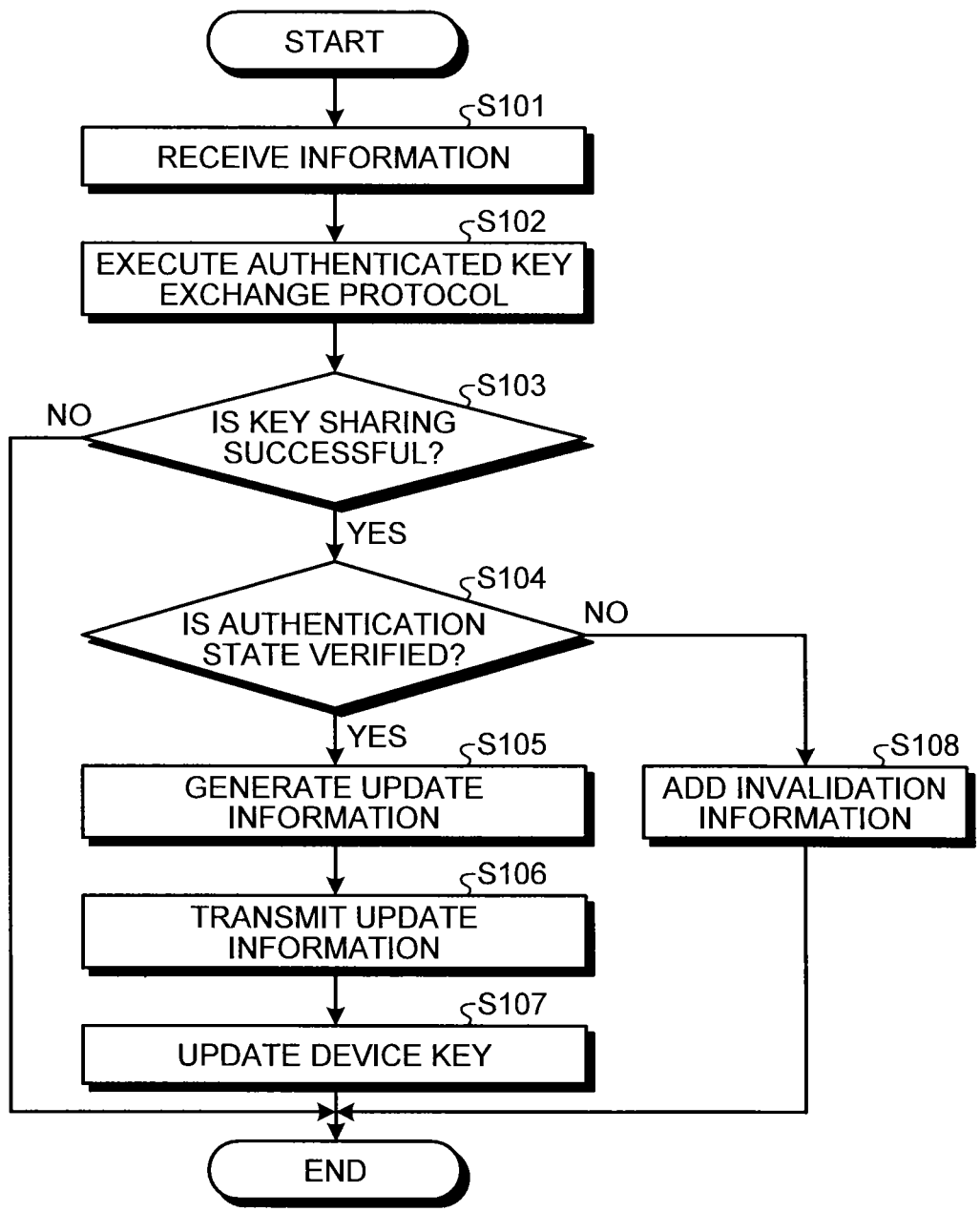
FIG. 4 is a flowchart of elimination processing performed by the key management device of the first embodiment.
Figure 5:
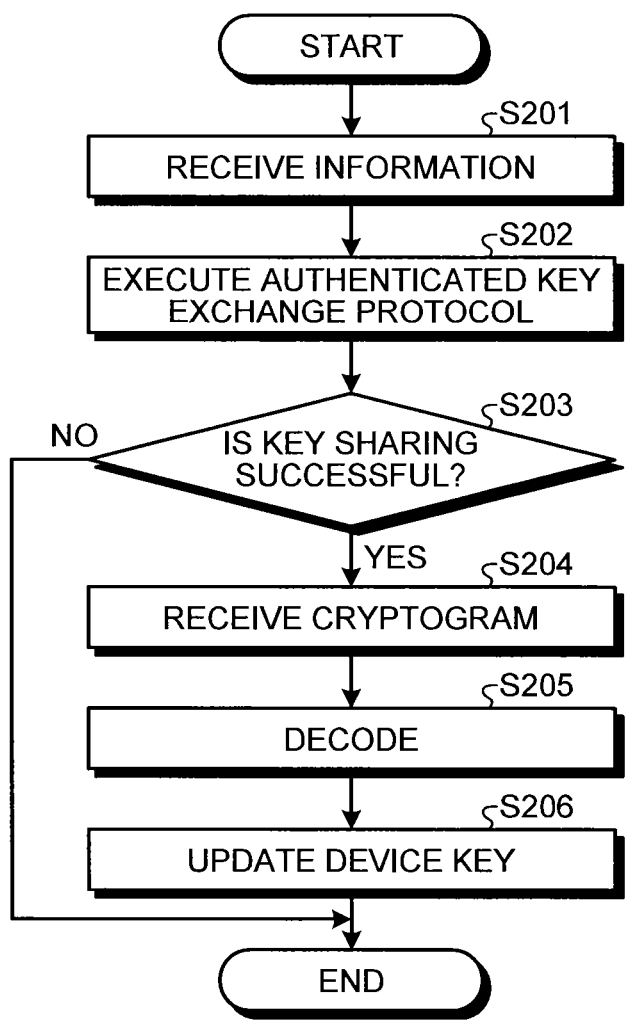
FIG. 5 is a flowchart of elimination processing performed by the nodes of the first embodiment.

FIG. 4 is a flowchart illustrating an example of the elimination processing performed by the key management device 100. First, the reception unit 101 of the key management device 100 receives information that triggers an authenticated key exchange protocol (such as a request for group control) from an external device or the like (step S101). The key exchange processing unit 103 executes the authenticated key exchange protocol (step S102).

The key exchange processing unit 103 determines whether or not key sharing with a node 200 is successful (step S103). When the key sharing is not successful (No at step S103), the elimination processing is terminated. When the key sharing is successful (Yes at step S103), the determination unit 104 verifies an authentication state. For example, the determination unit 104 determines whether the node 200 authenticated by the authenticated key exchange protocol has been already authenticated before executing the authenticated key exchange protocol with reference to the authentication state stored in the authentication state storage unit 122.

When the authentication state is verified, that is, the authenticated node 200 has not been authenticated before executing the authenticated key exchange protocol (Yes at step S104), the generation unit 105 generates update information (step S105). The transmission unit 102 transmits the generated update information to the node 200 (step S106). On the other hand, the update unit 106 updates a device key of the corresponding node 200 using the generated update information (step S107).

When the authentication state is not verified in step S104, that is, when the authenticated node 200 has already been authenticated before executing the authenticated key exchange protocol (No at step S104), the determination unit 104 stores invalidation information including a node ID and a device key of the corresponding node 200 in the invalidation information storage unit 123 (step S108), and the elimination processing is terminated.

FIG. 5 is a flowchart illustrating an example of the elimination processing performed by the node 200. First, the reception unit 201 of the node 200 receives information that triggers an authenticated key exchange protocol (such as a request for the start of authentication) from the key management device 100 (step S201). The key exchange processing unit 203 executes the authenticated key exchange protocol (step S202).

The key exchange processing unit 203 determines whether or not key sharing with the key management device 100 is successful (step S203). When the key sharing is not successful (No at step S203), the elimination processing is terminated. When the key sharing is successful (Yes at step S203), the reception unit 201 receives a cryptogram obtained by encrypting update information from the key management device 100 (step S204). The update unit 204 decodes the update information from the cryptogram using a shared key (step S205). The update unit 204 updates a device key stored in the device key storage unit 222 using the update information (step S206), and the elimination processing is terminated.

Figure 6:
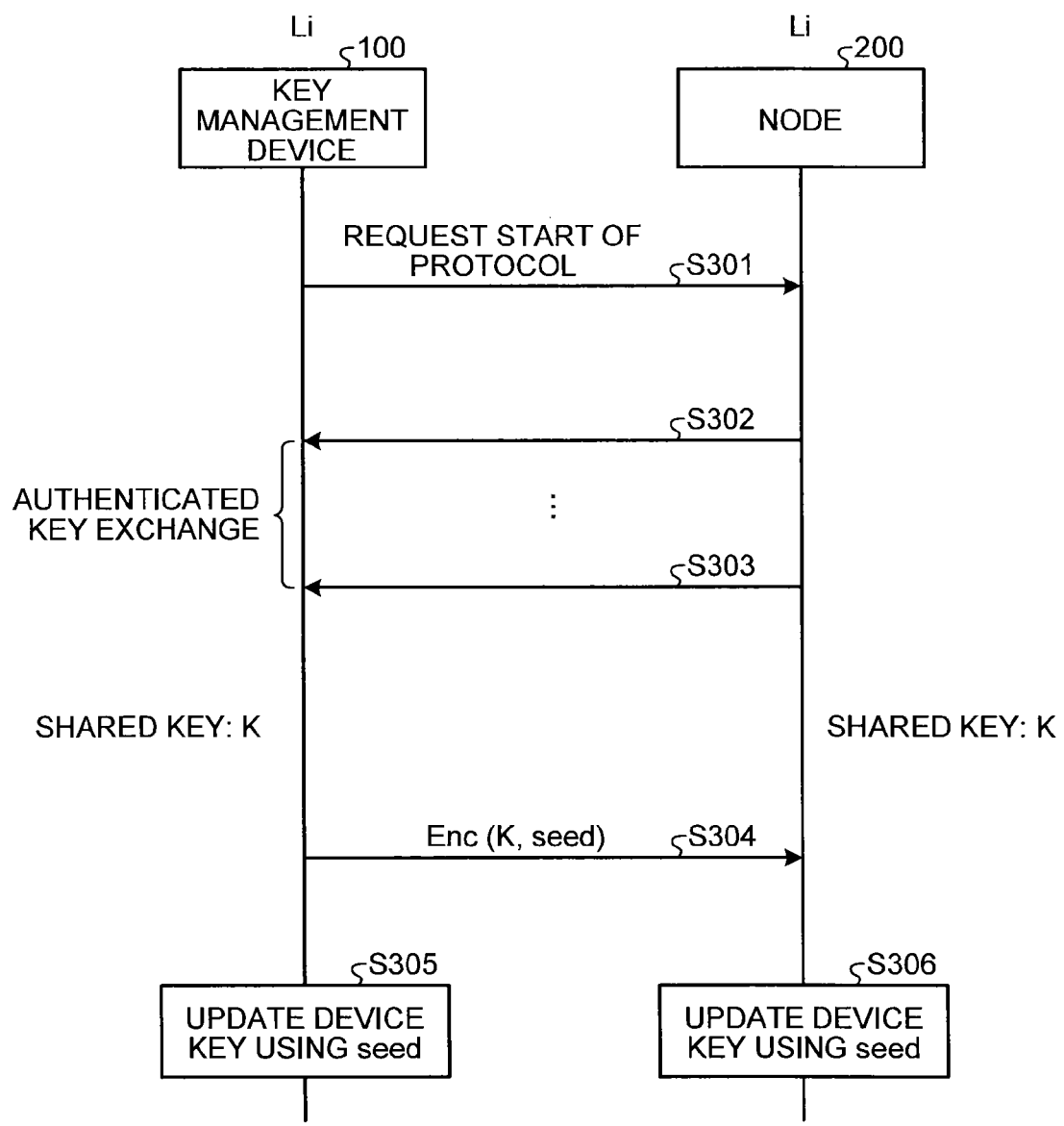
FIG. 6 is a sequence diagram of the elimination processing of the first embodiment.

Next, the flow of the elimination processing will be described with reference to a sequence diagram of FIG. 6. FIG. 6 is a sequence diagram illustrating an example of the elimination processing of the present embodiment. In the example of FIG. 6, the key management device 100 requests the start of an authenticated key exchange protocol to the node 200 (step S301). Thereafter, the authenticated key exchange protocol is executed between the key management device 100 and the node 200 (step S302, and step S303). In the authenticated key exchange protocol, a device key Li held by the key management device 100 and a device key Li held by the node 200 are used. More specifically, the key management device 100 authenticates the node 200 by confirming that the node 200 holds the device key Li. A shared key K is shared by the authenticated key exchange protocol.

The key management device 100 transmits Enc (K, seed) which is a cryptogram obtained by encrypting update information seed using the shared key K to the node 200 (step S304). The update unit 106 of the key management device 100 updates the device key Li using the update information seed (step S305). In the same manner, the update unit 204 of the node 200 updates the device key Li using the update information seed (step S306).

Variation 1

In FIG. 6, the authenticated key exchange protocol is started by the request from the key management device 100. In the present variation, the authenticated key exchange protocol is started by a request from a node 200'. The node 200' starts authentication by some trigger, for example, every time a predetermined time period elapses.

Figure 7:
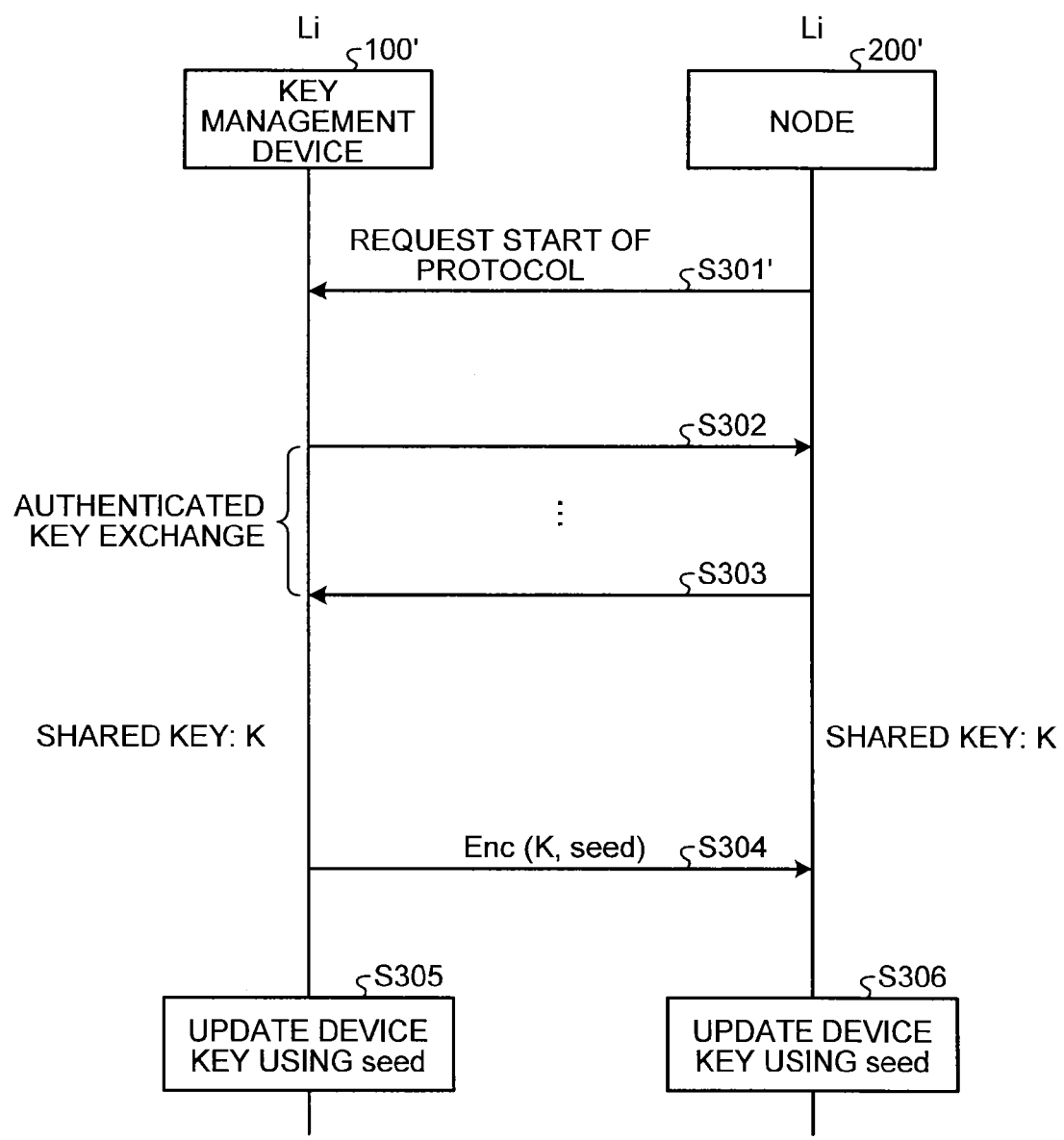
FIG. 7 is a sequence diagram of elimination processing of a variation.

FIG. 7 is a sequence diagram illustrating an example of elimination processing of the present variation. In the example of FIG. 7, the node 200' requests the start of an authenticated key exchange protocol to a key management device 100' (step S301'). Respective steps thereafter are the same as those of FIG. 6. Therefore, the same reference sings as those in FIG. 6 are applied, and a description thereof will be omitted.

As described above, in the communication system according to the first embodiment, the key management device 100 performs, with respect to a group of devices which is managed by device keys and an invalidation technique such as MKB, authentication using the device keys specific to the respective devices. When the devices pass the authentication, information for updating the device keys of the devices are securely sent. If a plurality of devices pass the authentication using a same device key, the device key is determined to be a leaked device key, and invalidation processing is performed. As a result, it is possible to eliminate a duplicated node 300 that responds to the authentication, and a duplicated node 300 that does not respond to the authentication.

Second Embodiment

In a communication system according to the second embodiment, functions of the key management device 100 of the first embodiment are decentralized into a plurality of devices. For example, a key management device 400 has a function to manage a device key, and a key management device 500 has a function to execute an authenticated key exchange and transmit update information. Further, in order to securely decentralize the functions, the key management device 500 does not hold a device key, and holds a value (a modified device key) that is derived by giving a device key to a pseudo random function or a one-way function. The key management device 500 executes the authenticated key exchange using the modified device key.

With such a configuration, even if all pieces of information held by the key management device 500 are leaked, it is possible to prevent the leakage of a device key itself. Therefore, the security of the entire system is improved. In addition, since the functions of authentication and key update can be securely decentralized into a plurality of devices, it is possible to improve the scalability of the system.

Figure 8:
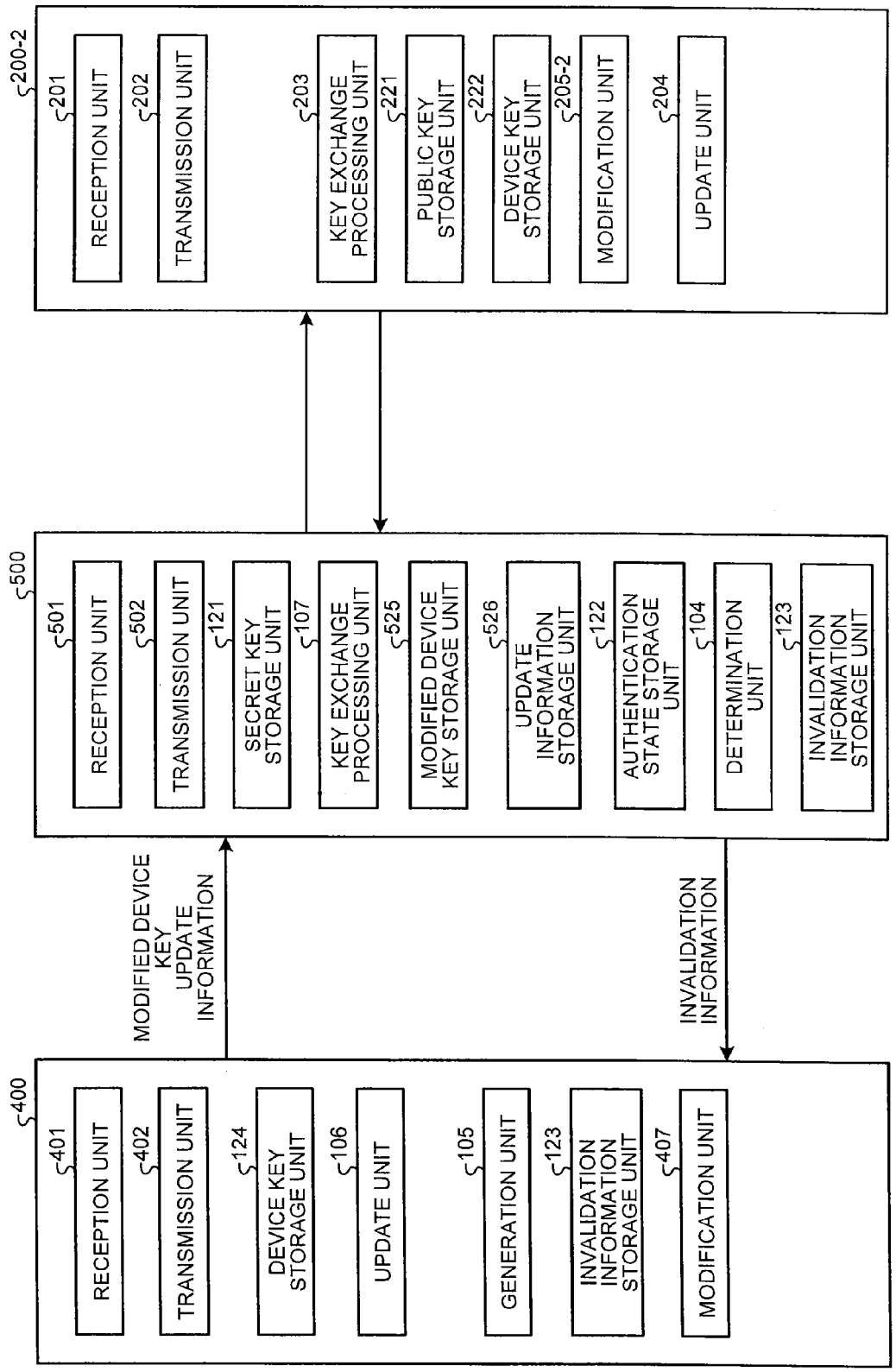
FIG. 8 is a block diagram of a communication system according to a second embodiment.

FIG. 8 is a block diagram illustrating an example of the configuration of the communication system according to the second embodiment. As shown in FIG. 8, the communication system of the present embodiment includes the key management device 400, the key management device 500, and a node 200-2. Although only a single node 200-2 is described for convenience of explanation, the key management device 500 may be connected to a plurality of nodes 200-2.

The key management device 400 is provided with a reception unit 401, a transmission unit 402, a device key storage unit 124, a generation unit 105, an update unit 106, an invalidation information storage unit 123, and a modification unit 407. The same functions as those in FIG. 2 are denoted by the same reference signs, and a description thereof will be omitted.

The reception unit 401 receives various pieces of information from an external device such as the key management device 500. The transmission unit 402 transmits various pieces of information to an external device such as the key management device 500. The transmission unit 402 sends a device key stored in the device key storage unit 124 to the modification unit 407 in response to, for example, input from an external device or a lapse of a predetermined time.

The modification unit 407 generates a modified device key from the sent device key. For example, the modification unit 407 stores therein a pseudo random function PRF that is common in the system, and determines the modified device key as a value PRF (Di) that is derived by giving each device key Di to the pseudo random function PRF. This is merely an example of a method for determining the modified device key. As another method, when device keys assigned to one node 200-2 are defined as (D1, D2, D3), a modified device key(s) of the node 200-2 may be configured as (PRF (D3)), (PRF D2, D3)), or (PRF (D1, D2), PRF (D3)). As just described, any rule can be used as long as being a modification rule for a modified device key that is previously determined in the system.

The modification unit 407 generates update information using the generation unit 105. The transmission unit 402 transmits the modified device key and the update information to the key management device 500. When invalidation information is sent from the key management device 500, the update unit 106 updates a device key of a node 200-2 that is not invalidated on the basis of the invalidation information, the update information, and the device key stored in the device key storage unit 124.

The key management device 500 is provided with a reception unit 501, a transmission unit 502, a secret key storage unit 121, a key exchange processing unit 107, a modified device key storage unit 525, an update information storage unit 526, an authentication state storage unit 122, a determination unit 104, and an invalidation information storage unit 123. The same functions as those in FIG. 2 are denoted by the same reference signs, and a description thereof will be omitted.

The reception unit 501 receives various pieces of information from an external device such as the key management device 400 and the node 200-2. The transmission unit 502 transmits various pieces of information to an external device such as the key management device 400 and the node 200-2.

The modified device key storage unit 525 stores therein a modified device key sent from the key management device 400. The update information storage unit 526 stores therein update information sent from the key management device 400. The generation unit 105 provided in the key management device 400 may be provided in the key management device 500, and update information generated in the key management device 500 may be sent to the key management device 400.

The key exchange processing unit 107 of the key management device 500 executes an authenticated key exchange with the node 200-2 using a modified device key and a secret key stored in the secret key storage unit 121.

The node 200-2 is provided with a reception unit 201, a transmission unit 202, a key exchange processing unit 203, a public key storage unit 221, a device key storage unit 222, a modification unit 205-2, and an update unit 204. The same functions as those in FIG. 3 are denoted by the same reference signs, and a description thereof will be omitted.

The modification unit 205-2 performs the same processing as that performed by the modification unit 407 which is provided in the key management device 400 to thereby derive a modified device key. The key exchange processing unit 203 executes an authenticated key exchange protocol using the modified device key.

In this manner, in the communication system according to the second embodiment, the key management device 400 has a function to manage a device key, and the key management device 500 has a function to execute an authenticated key exchange and transmit update information. As a result, even if all pieces of information held by the key management device 500 are leaked, it is possible to prevent the leakage of a device key itself. That is, the security of the entire system is improved.

As described above, according to the first and second embodiments, it is possible to easily identify a leaked device key.

Figure 9:
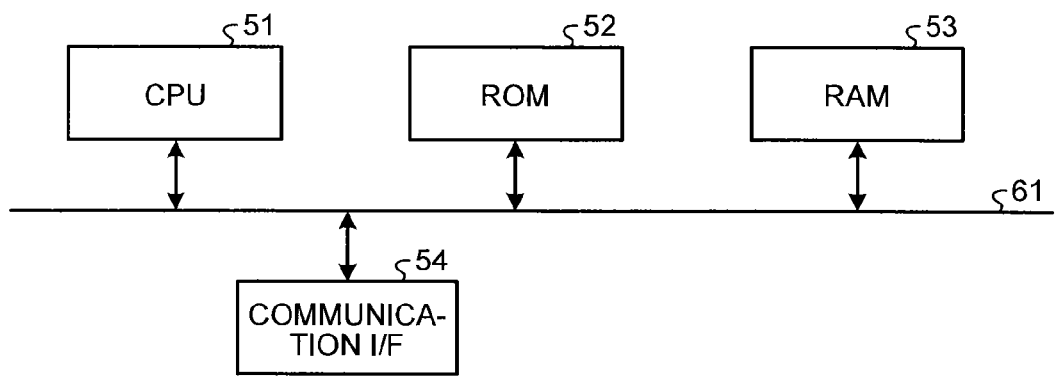
FIG. 9 is a diagram of the hardware configuration of each device of the first or second embodiment.

Next, the hardware configuration of each of the devices (the key management device and the node) according to the first or second embodiment will be described with reference to FIG. 9. FIG. 9 is an explanatory diagram illustrating the hardware configuration of each of the devices according to the first or second embodiment.

The device according to the first or second embodiment is provided with a control unit such as a central processing unit (CPU) 51, a storage unit such as a read only memory (ROM) 52 or a random access memory (RAM) 53, a communication interface (I/F) 54 which is connected to a network to perform communication, an external storage unit such as a hard disk drive (HDD) and a compact disc (CD) drive, a display unit such as a display, an input unit such as a keyboard and a mouse, and a bus 61 which connects the respective units to each other. That is, the device has a hardware configuration using an ordinary computer.

A program executed in the device according to the first or second embodiment is provided as a computer program product by being recorded on a computer-readable recording medium as a file of an installable format or an executable format. Specifically, the computer-readable recording medium includes a compact disk read only memory (CD-ROM), a flexible disk (FD), a compact disk recordable (CD-R), and a digital versatile disk (DVD).

The program executed in the device according to the first or second embodiment may be provided by being stored in a computer that is connected to a network such as the Internet, and causing the stored program to be downloaded via the network. Further, the program executed in the device according to the first or second embodiment may also be provided or distributed via a network such as the Internet.

Furthermore, the program in the first or second embodiment may also be provided by being previously embedded in a ROM or the like.

The program executed in the device according to the first or second embodiment has a module structure including the respective units described above. As actual hardware, the CPU 51 (processor) reads out the program from the recording medium to execute the program, and the respective units are thereby loaded on a main storage unit so that the respective units are generated on the main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management device to prevent unauthorized updating of a device key, the key management device comprising:
   an authentication state storage configured to store therein an authentication state including identification information of a communication device, the communication device having already been authenticated;
   a key exchange processing unit, implemented by circuitry, configured to perform a key exchange process between the key management device and a communication device to generate a shared key and to authenticate the communication device;
   a determination unit, implemented by the circuitry, configured to determine whether the communication device authenticated by a first key exchange process has already been authenticated by a second key exchange process before performing the first key exchange process on the basis of the authentication state;
   a transmission unit, implemented by the circuitry, configured
      to transmit update information for updating the device key of the communication device authenticated by the first key exchange process to the communication device authenticated by the first key exchange process when the communication device has not been authenticated by the second key exchange process, and
      not to transmit the update information when the communication device has already been authenticated by the second key exchange process; and
   an update unit, implemented by the circuitry, configured
      to update the device key using the update information when the communication device has not been authenticated by the second key exchange process, and
      to prevent unauthorized updating of the device key by not updating the device key when the communication device has already been authenticated by the second key exchange process.

2. The key management device according to claim 1, further comprising:
   a device key storage configured to store therein the device key of the communication device; and
   a secret key storage configured to store therein a secret key, wherein
   the key exchange processing unit, implemented by the circuitry, is configured to perform the key exchange process including a process for authenticating the communication device by the device key and a process for authenticating the key management device by the secret key.

3. The key management device according to claim 2, wherein
   the device key storage is configured to store therein a plurality of device keys corresponding respectively to a plurality of communication devices, and
   the key exchange processing unit, implemented by the circuitry, is configured to perform the key exchange process including the process for authenticating the communication devices by the device keys stored in the device key storage and the process for authenticating the key management device by the secret key.

4. The key management device according to claim 1, further comprising:
a device key storage configured to store therein output information obtained by inputting the device key of the communication device into a one-way function; and
a secret key storage configured to store therein a secret key, wherein
the key exchange processing unit, implemented by the circuitry, is configured to perform the key exchange process including a process for authenticating the communication device by the output information and a process for authenticating the key management device by the secret key.

5. The key management device according to claim 4, wherein
the device key storage is configured to store therein a plurality of pieces of output information corresponding respectively to a plurality of communication devices, and
the key exchange processing unit, implemented by the circuitry, is configured to perform the key exchange process including the process for authenticating the communication devices by the pieces of output information stored in the device key storage and the process for authenticating the key management device by the secret key.

6. The key management device according to claim 1, further comprising:
a public key storage configured to store therein a public key of the communication device; and
a secret key storage configured to store therein a secret key, wherein
the key exchange processing unit, implemented by the circuitry, is configured to perform the key exchange process including a process for authenticating the communication device by the public key and a process for authenticating the key management device by the secret key.

7. The key management device according to claim 1, wherein the key exchange processing unit, implemented by the circuitry, is configured to perform the key exchange process between the key management device and one or more communication devices connected to the key management device when a predetermined time period elapses.

8. The key management device according to claim 1, wherein the key exchange processing unit, implemented by the circuitry, is configured to perform the key exchange process between the key management device and one or more communication devices specified by an external device.

9. The key management device according to claim 1, wherein
the key exchange processing unit, implemented by the circuitry, is configured to perform the key exchange process between the key management device and a plurality of communication devices, and
the transmission unit, implemented by the circuitry, is configured to transmit the update information common in the communication devices to the communication devices authenticated by the key exchange process when pieces of identification information of the respective communication devices are not stored in the authentication state storage.

10. The key management device according to claim 1, wherein
the authentication state includes a number of authentication successes of a communication device, and
the determination unit, implemented by the circuitry, is configured to determine that a communication device authenticated by the key exchange process has already been authenticated by the second key exchange process when the number of authentication successes exceeds a predetermined threshold.

11. A communication device to prevent unauthorized updating of a device key, the communication device comprising:
a device key storage configured to store therein the device key;
a key exchange processing unit, implemented by circuitry, configured to perform a key exchange process including authenticating a key management device and generating a shared key using a device key of the communication device and a public key received from the key management device; and
an update unit, implemented by the circuitry, configured to update the device key on the basis of update information for updating the device key, the update information being transmitted from the key management device when the communication device has not already been authenticated by a second key exchange process, thereby to prevent unauthorized updating of the device key.

12. The communication device according to claim 11, further comprising a public key storage configured to store therein a public key used in authentication of the key management device, wherein
the key exchange processing unit, implemented by the circuitry, is configured to perform the key exchange process including a process for authenticating the communication device by the device key and a process for authenticating the key management device by the public key.

13. The communication device according to claim 11, further comprising a public key storage configured to store therein a public key used in authentication of the key management device, wherein
the key exchange processing unit, implemented by the circuitry, is configured to perform the key exchange process including a process for authenticating the communication device by output information obtained by inputting the device key into a one-way function and a process for authenticating the key management device by the public key.

14. The communication device according to claim 11, further comprising:
a public key storage configured to store therein a public key used in authentication of the key management device; and
a secret key storage configured to store therein a secret key, wherein
the key exchange processing unit, implemented by the circuitry, is configured to perform the key exchange process including a process for authenticating the communication device by the secret key and a process for authenticating the key management device by the public key.

15. A computer program product comprising a non-transitory computer-readable medium containing a program executed by a computer that includes an authentication state storage configured to store therein an authentication state including identification information of a communication device, the communication device having already been authenticated, the program causing the computer to execute:

performing a key exchange process between the computer and a communication device to generate a shared key and to authenticate the communication device;

determining whether the communication device authenticated by a first key exchange process has already been authenticated by a second key exchange process before performing the first key exchange process on the basis of the authentication state;

transmitting update information for updating a device key of the communication device authenticated by the first key exchange process to the communication device authenticated by the first key exchange process when the communication device has not been authenticated by the second key exchange process, and not transmitting the update information when the communication device has already been authenticated by the second key exchange process; and updating the device key using the update information when the communication device has not been authenticated by the second key exchange process, and preventing unauthorized updating of the device key by not updating the device key when the communication device has already been authenticated by the second key exchange process.

16. A computer program product comprising a non-transitory computer-readable medium containing a program executed by a computer that includes a device key storage configured to store therein a device key, the program causing the computer to execute:

performing a key exchange process including authenticating a key management device and generating a shared key using a device key of the computer and a public key received from the key management device; and updating the device key on the basis of update information for updating the device key, the update information being transmitted from the key management device when the communication device has not already been authenticated by a second key exchange process, thereby to prevent unauthorized updating of the device key.

17. A communication system to prevent unauthorized updating of a device key, the communication system comprising:

a key management device; and at least one communication device, wherein the key management device includes
an authentication state storage configured to store therein an authentication state including identification information of the at least one communication device, the at least one communication device having already been authenticated;

a first key exchange processing unit, implemented by first circuitry, configured to perform a key exchange process between the key management device and the at least one communication device to generate a shared key and to authenticate the communication device;

a determination unit, implemented by the first circuitry, configured to determine whether the at least one communication device authenticated by a first key exchange process has already been authenticated by a second key exchange process before performing the first key exchange process on the basis of the authentication state;

a transmission unit, implemented by the first circuitry, configured
to transmit update information for updating the device key of the at least one communication device authenticated by the first key exchange process to the at least one communication device authenticated by the first key exchange process when the at least one communication device has not been authenticated by the second key exchange process, and
not to transmit the update information when the at least one communication device has already been authenticated by the second key exchange process; and a first update unit, implemented by the first circuitry, configured
to update the device key using the update information when the at least one communication device has not been authenticated by the second key exchange process, and
to prevent unauthorized updating of the device key by not updating the device key when the at least one communication device has already been authenticated by the second key exchange process, and the at least one communication device includes
a device key storage configured to store therein the device key;
a second key exchange processing unit, implemented by second circuitry, configured to perform the key exchange process between the at least one communication device and the key management device; and
a second update unit, implemented by the second circuitry, configured to update the device key on the basis of the update information for updating the device key, the update information being transmitted from the key management device.

18. The communication system according to claim 17, wherein the first key exchange processing unit, implemented by the first circuitry, is configured to derive the shared key when both of authentication for indicating to the at least one communication device that the key management device holds a secret key paired with a public key and authentication for indicating to the key management device that the at least one communication device holds the device key previously assigned to the at least one communication device are successful, the transmission unit, implemented by the first circuitry, is configured to transmit a cryptogram obtained by encrypting the update information by the shared key to the at least one communication device when the shared key is derived, the first update unit, implemented by the first circuitry, is configured to update the device key held by the key management device using the update information, and the second update unit, implemented by the second circuitry, is configured to
derive the update information by decoding the cryptogram received from the key management device by the shared key, and
update the device key by the derived update information.

19. The communication system according to claim 17, wherein
the key management device further includes
a device key storage configured to store therein the device key of the at least one communication device; and
a secret key storage configured to store therein a secret key, wherein
the first key exchange processing unit, implemented by the first circuitry, is configured to perform the key exchange process including a process for authenticating the at least one communication device by the device key and a process for authenticating the key management device by the secret key.

* * * * *